United States Patent [19]

Bartusel et al.

[11] 4,361,428
[45] Nov. 30, 1982

[54] PROCESS AND APPARATUS FOR REGULATING THE TEMPERATURE OF A GLASS SHEET IN A MULTI-CELL FURNACE

[75] Inventors: Karl R. Bartusel, Stolberg; Mario Roth, Aachen; Walter Schamberg, Herzogenrath; Josef Willems, Alsdorf Hoengen, all of Fed. Rep. of Germany

[73] Assignee: Saint-Gobain Vitrage, France

[21] Appl. No.: 288,808

[30] Foreign Application Priority Data

Aug. 6, 1980 [FR] France ................................. 8017345

[22] Filed: Jul. 31, 1981
[51] Int. Cl.³ .............................................. C03B 29/04
[52] U.S. Cl. ......................................... 65/29; 65/118; 65/162
[58] Field of Search ........................... 65/29, 118, 162

[56] References Cited

U.S. PATENT DOCUMENTS

| | | | |
|---|---|---|---|
| 3,294,513 | 12/1966 | Beattie | 65/118 |
| 3,479,172 | 11/1969 | McCown et al. | 65/162 X |
| 3,744,985 | 7/1973 | Peternel | 65/118 X |
| 3,744,985 | 7/1973 | Peternel | 65/118 X |
| 3,764,799 | 10/1973 | Nara . | |
| 3,839,000 | 10/1974 | Peternel | 65/29 |
| 3,942,967 | 3/1976 | Jack et al. | 65/118 X |
| 4,043,780 | 8/1977 | Bricker et al. | 65/162 X |
| 4,071,344 | 1/1978 | Blausey, Jr. | 65/29 |
| 4,071,344 | 1/1978 | Blausey, Jr. | 65/29 |
| 4,119,426 | 10/1978 | Kelly | 65/111 |

FOREIGN PATENT DOCUMENTS

| | | |
|---|---|---|
| 1106039 | 5/1959 | Fed. Rep. of Germany . |
| 1596382 | 12/1966 | Fed. Rep. of Germany . |
| 794398 | 12/1935 | France . |
| 78780 | 1/1971 | German Democratic Rep. . |

Primary Examiner—Arthur D. Kellogg
Attorney, Agent, or Firm—Pennie & Edmonds

[57] ABSTRACT

The invention relates to a process for regulating the temperature of a glass sheet in a furnace as the glass sheet is moved at a determined rate and heated according to a preestablished program. The furnace is characterized by only slight thermal inertia thereby to provide rapid adjustment of the internal temperature within each of several cells. The physical presence of the glass sheet is checked in synchronization with its step-by-step advance at least at one location upstream of one furnace cell to correct the regulation of the radiation heating output should these be a variance from that of the preestablished program. The process may be carried out with limited fabrication rejects by virtue of the capability of regulation of variations of the conveying rate or as required due to gaps in the succession of glass sheets being treated.

18 Claims, 4 Drawing Figures

PROCESS AND APPARATUS FOR REGULATING THE TEMPERATURE OF A GLASS SHEET IN A MULTI-CELL FURNACE

FIELD OF THE INVENTION

The invention relates to a process for regulating the temperature of a glass sheet in a furnace comprising a plurality of successive cells between an entry to the furnace and an exit from the furnace. Each glass sheet is moved from one cell to the next at a determined rate, and the heating power of internal heating devices within each cell is regulated at a fixed level according to a preestablished program. Regulation is carried out by a power regulator controlled by temperature data obtained from each cell.

BACKGROUND ART

It is known that the temperature of the glass sheet should be regulated precisely in both tempering and bending operations if products having constant characteristics are to be obtained. Various regulating systems have been developed, with the objective of obtaining the best possible characteristics of constancy of the glass sheet at the furnace exit. Normally, the glass sheets, suspended by self-locking clamps from a mobile carriage and moved in successive advances through a furnace, during tempering are heated within the furnace to a required temperature. Bending according to practiced techniques may be carried out before tempering. Such an overall process, that is, a process including bending and/or tempering, may be followed in the production of automotive window.

According to the prior art, it is known to provide a thermocouple to both respond to an electric heating device and provide a data signal to a regulator to maintain the temperature of the heating device(s), and the furnace, relatively constant (FR 794,398, DE AS 1,106,039). It is also known that the cells of a furnace, and even separate zones of the same cell may be heated according to a different program (DE OS 2,837,985).

It has also been proposed in the regulation of multi-cell furnaces wherein the glass sheets are suspended from conveying carriages and subject to interrupted advance to regulate the temperature of the heating elements to a predetermined value and use the measurement of temperature of the glass sheet as it exits the furnace as a regulation factor (U.S. Pat. No. 3,744,985).

In another process of the prior art individual cells of a furnace may be provided with a constant electric power input and, if the furnace temperature should deviate from a reference value, the rate of movement of each glass sheet through the furnace will be corrected (DE AS 1,596,382).

It is also known in the prior art to use an optical pyrometer at the furnace exit to measure the temperature of glass sheets, oriented in a horizontal position for movement, and regulate the rate of advance of the glass sheets through the furnace as a function of any deviation in temperature of the glass sheet at the exit from a desired value (DE OS 2,746,301). In this process, a microprocessor provides regulation control.

Finally, the prior art describes the use of thyristor units to regulate a power input (DD PS 78 780).

Many of the known systems function satisfactorily in a fabrication process, particularly in situations that the glass sheets of the same size, and of the same mass, are moved through a furnace at a constant rate and under established conditions of balance of an approximate equilibrium of furnace energy. Many of these furnaces comprise massive structures providing satisfactory insulation capability and strong thermal inertia, resulting in a good heat stability. Advantageously, these furnaces are not extremely sensitive to outside disturbances; on the other hand, these furnaces are not able satisfactorily to rapidly rebalance disturbances of operating conditions. Under the influence of the regulating system, the average temperature undergoes slight oscillation, but at a lower frequency than the rate of advance of the glass sheets through the furnace. Consequently, when temperature measurements are made inside the furnace, the temperature modifications do not immediately affect the glass sheets being treated. Rather, the effects of the temperature modifications are recognized after a considerable delay.

Further, it has been found the particular regulation difficulties arise under the above-noted circumstances, as, for example, under circumstances of disturbance of the energy balance and in situations of difficulties which may be linked to variances in the rate of advance of the carriage or in the regularity of advance of the glass sheets. Further, regulation difficulties may be experienced if one or more glass sheets release from the support structure so that the carriage, in its cycle, follows the path through the furnace either empty or with a number of glass sheets less than the number originally provided.

In the prior art, it has been impossible or substantially difficult to regulate the heating power in the furnace cells, if a gap occurs in the conveying system, so that the glass sheets that follow immediately after the vacant spot are heated to a satisfactory temperature. In general, several defective glass sheets will be found to have exited the furnace before it is able to regain balance.

SUMMARY OF THE INVENTION

The invention provides an improvement over furnaces of the prior art and as an important aspect relates to a furnace having a rapid response time, that is, a furnace with only slight thermal inertia. The furnace of the invention is intended for treating glass sheets in a tempering operation and functions in a manner to limit as best as possible the fabrication of glass sheets having unsatisfactory characteristics, such as characteristics which derive from an improper heating operation. Improper heating may result from a possible variation in the rate of advance of glass sheets from the rate of advance defined by a preestablished program and/or the occurrence of possible gaps in the number of glass sheets moved by the conveying carriages. To this end, referring to the last-mentioned possibility, a gap in the number of glass sheets moved by the conveying carriages will result in a failure of the next glass sheet following the gap to meet the desired temperature standard at the exit from the furnace. The gap in the number of glass sheets results in improper power regulation within a cell or cells of the furnace.

As a first characteristic of the invention, the presence or absence of a glass sheet is checked in synchronism with a step-by-step advance signal. Checking occurs at least at a location upstream of one cell of the furnace. The electric power is regulated in the following cells of the furnace as a function of a signal indicative of a coincidence between the advance signal and a signal representing either the presence or absence of a glass sheet.

Consequently, regulation of electric power is by anticipation, that is, the electrical power input to a cell of the furnace is determined before arrival of the glass sheet in that cell. If a gap exists in the glass sheets being conveyed by the carriages, the electrical power input to the cell is lowered to a level fixed by the program before the glass sheet arrives at the cell. Thus, a temperature imbalance is avoided.

According to the process of the invention, the presence or absence of a glass sheet, at the entry into the furnace, is checked by a feeler or an optical reflection barrier comprising a light source and a photoelectric cell.

As a second characteristic of the invention, the presence or absence of a glass sheet also is checked within the furnace in a location between two cells, and, in addition, the temperature of the glass sheet is measured at that location.

A temperature measurement may be carried out by a pyrometer of the radiation type and, under normal operating conditions, the electrical power input to the following cells is regulated as a function of the temperature measured. To avoid errors in measurement under influence of the temperature of the walls of the furnace it is preferable to use a pyrometer having a relatively narrow measuring area, and to direct the measuring area across the furnace enclosure from one wall to focus within an opening in the opposite wall.

The measuring process may be refined by the use simultaneously of a plurality of pyrometers in superposed zones of each cell. The pyrometers are similarly located and focused, and serve to regulate electrical heating power input to the individual zones.

A further characteristic of the invention provides for the measurement of the temperature of the glass sheet as it exits the furnace. The temperature measurement may be taken by a pyrometer of the optical type. Electric power input to each of the cells of the furnace is regulated as a function of this measurement.

It is particularly advantageous to process all data in a microprocessor in the regulation of the several cells, and their zones, of the furnace. Again, regulation of the cells and zones is carried out as a function of a variance in data from a preestablished program.

As previously discussed, the process may be carried out with good results if the heating elements of resistive type have a fast response and the insulating material of the furnace has only slight thermal inertia.

Other important aspects and characteristics of the invention will become clear as the text continues.

BRIEF DESCRIPTION OF THE DRAWING

FIG. 1A is an enlarged view of the encircled area in FIG. 1 illustrating the wall and resistive elements of cell I in greater detail;

BEST MODE FOR CARRYING OUT THE INVENTION

Figure 1:
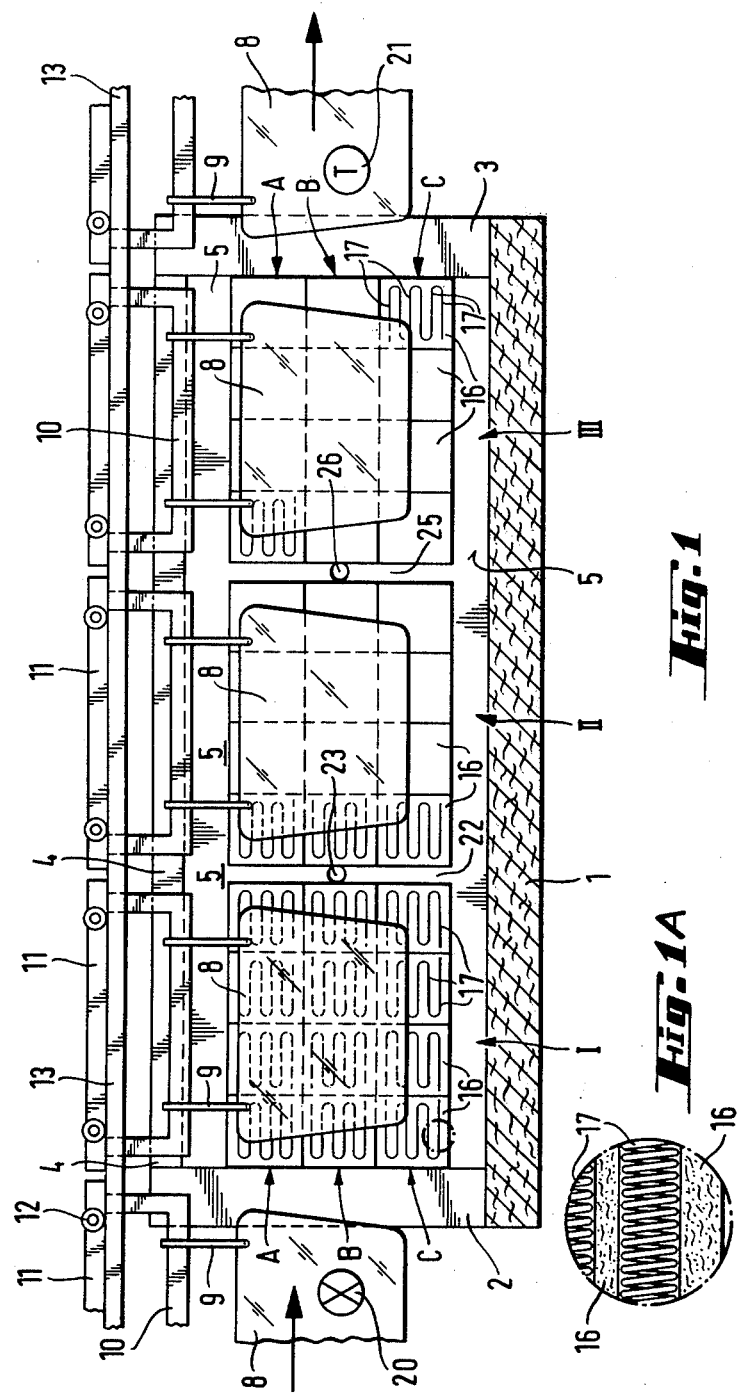
FIG. 1 is a diagrammatic view of a multi-cell furnace as seen in vertical section along substantially the longitudinal axis of the furnace.

Referring to FIG. 1, there is illustrated a furnace having an entry for glass sheets at an upstream location and an exit from which glass sheets emerge at a downstream location. More particularly, the furnace includes a hearth 1, a pair of walls 2 and a pair of walls 3 which extend upwardly from the hearth at the entry and exit, respectively, a pair of dome elements 4 situated above the hearth and a pair of sidewalls 5, each of which extend between the hearth and one dome element. The walls likewise extend to dome elements thereby to enclose substantially the interior of the furnace. As is conventional, the furnace is formed of an insulating material to permit the development of high temperature conditions within the enclosure as required for tempering of the glass sheets. The glass sheets to be tempered may have first undergone a bending operation comprising one step in the overall fabrication process of an automotive window.

The walls 2, and the walls 3, are spaced apart whereby the entry and exit are characterized by vertical slits having a width sufficient to accommodate passage of glass sheets 8 in a vertically suspended attitude. The slits, further, are of a length to accommodate the glass sheets and at least a portion of the structure upon which the glass sheets are suspended. Each dome element extends from its supporting wall over the hearth to form a slot colinear with the slits. The slot, thus, provides an opening for the supporting structure which extends into the enclosure. To this end, the required spacing of the walls 2, 3 and dome elements 4 will be determined by the physical dimension of the supporting structure.

The furnace of the invention includes at least one cell within the enclosure between the entry and exit. Preferably, the furnace includes three cells, successively located, although it is contemplated that the furnace may include a greater number. To this end, a larger, greater production installation may employ five, six or even more cells.

As seen in FIG. 1, the cells are identified "I", "II" and "III", and each cell represents one region subject to precisely regulated temperature conditions into which and through which the glass sheets move in a predetermined step-by-step advance. During normal continuous operations each cell will be occupied by a glass sheet.

The supporting structure for each glass sheet includes a frame 10, a carriage 11 upon which the frame is mounted and a pair of clamps 9. The frame generally is in the form of a U-shaped member, and the clamps are carried at opposite ends of the web of each frame. In the illustrated embodiment, the web of each frame is of a length to extend substantially the length of a cell, and the clamps suspend the glass sheet so that its entire surface area is within the confines of a cell and adjacent the wall and resistive elements of the cell as it moves within the furnace. A rail 13 is located above the furnace and supported longitudinally of the furnace by any suitable structure (not shown). Each carriage includes a plurality of wheels 12 for movement along the rail. Any conventional drive (also not shown) may be used for movement of glass sheets uninterruptedly in the aforementioned step-by-step sequence.

As will be described, the heating power of the resistive elements of each cell is regulated to a substantially fixed level. Regulation is carried out according to a preestablished program under control of a microprocessor identified as "$\mu P$" in FIG. 3 responsive to various data derived from various responsive devices hereinafter described.

With continued reference to FIG. 1, each cell I, II and III is divided into superposed zones including zones "A", "B" and "C". The zones comprise a top zone, middle zone and bottom zone, respectively, and extend throughout the length of each cell.

Wall elements 16 are located along the sidewalls 5 within the region of each cell I, II and III. Each wall element is formed of a sheet of insulating material of agglomerated ceramic fibers (see FIG. 1A), providing in one form of the invention, an active surface in which resistive elements 17 may be incorporated either totally or partially. It is also contemplated, in another form of the invention, that the resistive elements may be suspended in a position in front of the insulating material. Preferably, however, the resistive elements 17 are incorporated in the insulating material, toward the interior of the furnace thereby to provide a radiant heat output for purposes of tempering the glass sheets. Wall elements of this type are identified as FIBROTHAL, a registered trademark of BULTEN KANTHAL GmbH. Those wall elements provide good results in that the resistive elements have a fast response and the insulating material has only slight thermal inertia. More particularly, the results flow from the physical characteristics of the insulating material which is of a specific weight only a fraction of that of conventional insulation. Because of this characteristic the material displays only slight thermal inertia which entails very short heating and cooling times. The insulating material, while of reduced specific weight, nevertheless is highly insulative.

A system of readout and detection devices is provided for purposes, among others, of responding to the presence or absence of a glass sheet at a location prior to entry into the interior of the furnace, and at locations therein, and both to the temperature of the glass sheet during processing and the measurement of temperature of the resistive elements. Since the operation is preprogrammed, disparities or variances in the measured temperature of glass sheets and programmed temperature, which may be because of the absence of a glass sheet, will result in independent regulation of the radiation energy output in a cell. These devices include an optical barrier 20 (see FIG. 1) located at the entry to the furnace and a pyrometer 21 located at the exit of the furnace. It is contemplated, also, that a feeler may be located at the entry to the furnace in substitution for the optical barrier. The pyrometer may be a radiation or optical pyrometer which measures the temperature of the glass sheet as it leaves the furnace and the optical barrier may comprise a light and a photocell to determine the presence or absence of a glass sheet during the programmed step-by-step advance sequence. The feeler would provide the same sensing operation. The optical barrier is preferred.

The furthest upstream and downstream cells extend substantially to the entry and exit slits of the walls 2, 3, respectively, and an unheated zone is located along each of the sidewalls 5 to separate adjacent cells, whether there are two, three or more cells within the furnace. To this end, a first unheated zone 22 separates cells I and II, and a second unheated zone 25 separates cells II and III. An opening 23 is formed in wall 5 within zone 22, and an opening 26 is formed in wall 5 within zone 25. Pyrometers 24, 27 (see FIG. 3) are disposed in the other wall 5 opposite openings 23, 26, respectively. The pyrometers may be of the radiation type, and each pyrometer is located opposite an opening so that the temperature measurement is not influenced by radiation emanating from the wall 5. The pyrometers establish, during the step-by-step advance sequence, whether a glass sheet is present to enter the regions of cells II and III and, additionally, they measure, as a single spot or line measurement, the temperature of the glass sheet entering into the regions of cells II and III. In a more refined version of the furnace, a plurality of openings, like the openings 23 and 26, may be located in unheated zones 22 and 25, at the level of each of the zones A, B and C, and a pyrometer may be disposed opposite each opening. To this end, the system will have a capability of independent response in the measurement of the temperature of the glass sheet within the regions adjacent the several zones of each cell.

Pyrometers and their operation, such as pyrometers of the optical or radiation types, are known to the prior art.

A thermocouple 30, 31, . . . 38 (see FIG. 3) is located in zones A, B, . . . C of cells I, . . . and III, respectively. The thermocouples provide an instantaneous measurement of the temperature of resistance elements 17 in each zone of each cell region and the radiation energy output. The respective thermocouples control the resistive elements to provide the aforementioned capability of independent regulation of heat in the several zones, as may be required. The thermocouples are located so that the soldering of the same is placed in front of the surface of the resistive elements and close to that surface.

Figure 2:
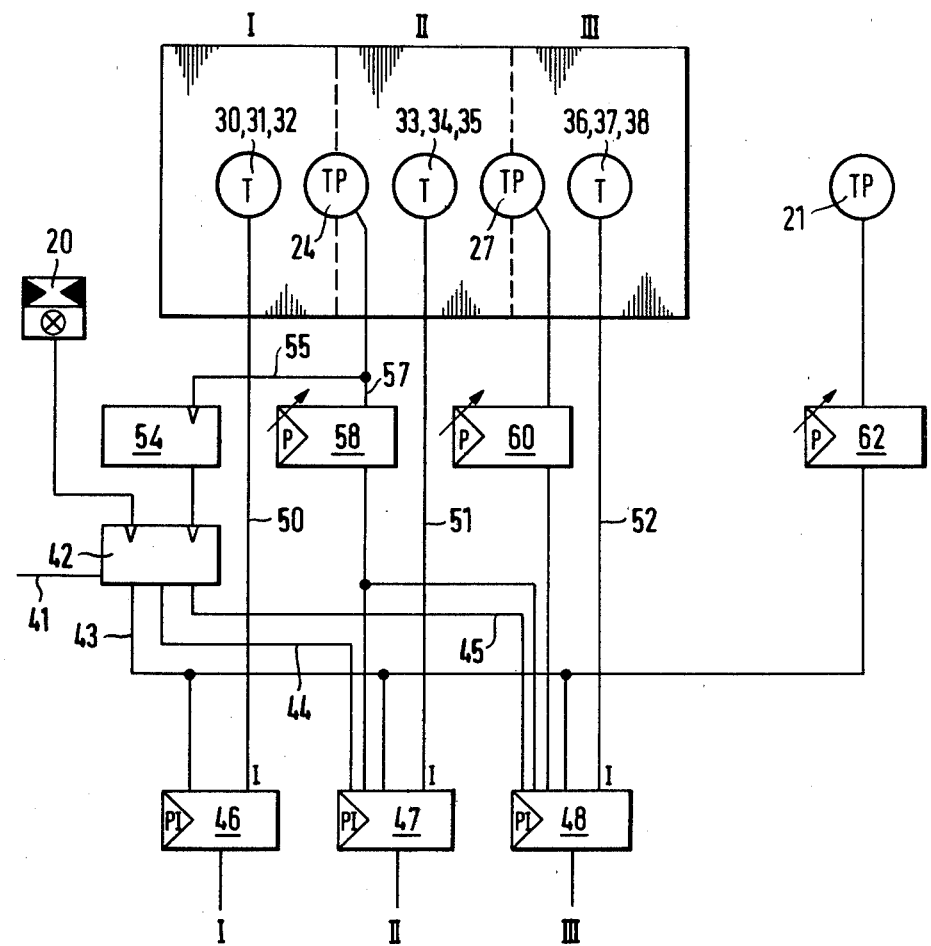
FIG. 2 is a block and wiring diagram illustrating check and measurement locations and the manner of processing of data.
Figure 3:
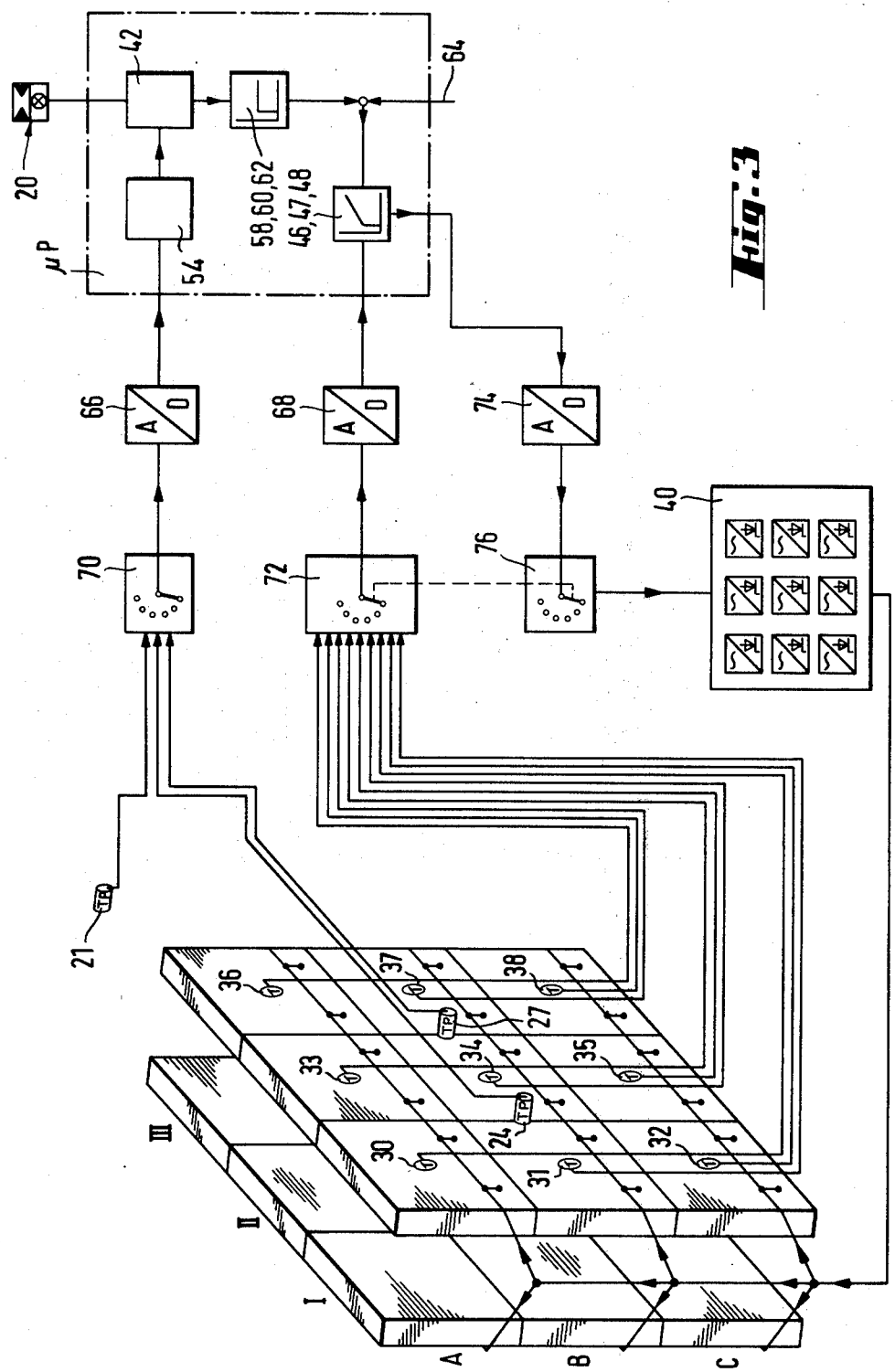
FIG. 3 is a block and wiring diagram of the regulating circuit of the process of the invention.

According to operation of the furnace, all readouts and temperature measurement data, such as a signal from optical barrier 20, the values of temperature of the glass sheet measured by pyrometers 21, 24 and 27, and instantaneous measurement of the radiant energy output of the resistive elements measured by thermocouples 30, 31, . . . 38 are introduced into a microprocessor (see FIGS. 2 and 3). These data enable regulation of each cell I, II and III, and the zones thereof, as a function of a preestablished program.

The microprocessor may be any one of several types identified as CP 80, manufactured and/or sold by AEG Company; S5 and S150, manufactured and/or sold by Siemens Company; and TSX 80, manufactured and/or sold by Telemecanique Company. These devices are well-known and a specific discussion of the same, except as to describe the operation of the furnace, is deemed unnecessary.

A thyristor 40 (see FIG. 3) controls the supply of electric power to each cell I, II and III, and the several zones. Typically, the thyristor is a rapid response switch, such as a silicon-controlled rectifier (SCR) or a silicon-controlled switch (SCS).

Operation of the furnace and the precise regulation of temperature within its interior or enclosure for tempering glass sheets should become apparent through a reading of the following text taken together with reference to FIGS. 2 and 3 of the drawing. Thus, a signal indicating a programmed predetermined rate of advance of carriages 11 and glass sheets 8 is received by memory register (memory) 42 along line 41. A signal verifying the presence of a glass sheet likewise is received by the memory. The verification signal may be developed by optical barrier 20 or in the alternative by the feeler (not shown) as each glass sheet in sequence is in a ready position to enter into the furnace through the entry formed by walls 2. The repetition rate of the verification signal preferably will correspond in some manner to the programmed, predetermined rate of the advance signal so that coincident signals may be received to two inputs to the memory. Thus, at a programmed instant of an advance signal along line 41, the memory should receive a signal from optical barrier 20, the memory will generate an output signal. The output signal, verifying the presence of a glass sheet at the position of entry into the furnace, is connected to each of three integral proportional regulators (integral regulator) 46, 47 and 48. To this end, a line 43 connects an output of the memory to an input of the respective integral regulators. A representation of the coincident inputs, also, is advanced in the memory for purposes as will be discussed.

Integral regulator 46, responsive to an output of the memory, is activated immediately to initiate operation of the resistive elements 17 within cell I either to raise the temperature within the cell from a fixed level or some lower level to a level as determined for a normal heating program. There is no immediate response of either the integral regulator 47 or the integral regulator 48 since these devices require further inputs in order to initiate operation of the resistive elements 17 within their respective cells.

As the glass sheet 8 advances into the furnace and into the region of cell I it is heated by heat radiating from the resistive elements 17 along the walls of the furnace. Thermocouples 30, 31 and 32 are responsive to the level of the radiation energy output and generate an analog signal output indicative of the level along line 50. The signal from the thermocouples 30, 31 and 32 is connected to an input of integral regulator 46. (All signals generated either by a thermocouple or pyrometer are analog signals and, as will be discussed, these signals are converted to a digital signal as required by the microprocessor.) Should there be a variance in the level of the radiation energy output from that of the programmed level, the integral regulator 46 functions either to increase or decrease the delivery of electrical power to the resistive elements. Consequently, the temperature within the region of cell I will be increased or decreased. If there is no appreciable variance, then the level of electrical power will be maintained at the programmed level.

The above discussion describes the condition of system components when there is a coincidence of inputs, that is, an input representing a verification signal and an input representing an advance signal, at separate input terminals of memory 42. If, on the other hand, there is no coincidence of these signals at separate inputs of the memory 42, representing a lack of presence of a glass sheet at the entry to the furnace, then there is no output along 43 to any of the integral regulators. The lack of an output will immediately function to reduce or maintain the temperature within cell I at the fixed level. The condition of cells II and III will be controlled similarly at the prescribed intervals that the step-by-step advance mechanism for glass sheets would have moved the glass sheet had it been sensed as present into the respective cells. Continued step-by-step advance of the glass sheet into cell II and ultimately into cell III results in operation of pyrometers 24 and 27. Thermocouples 33, 34 and 35 in cell II and thermocouples 36, 37 and 38 in cell III will also provide a response to the level of the radiant energy output of the resistive elements in the respective cells. Normally, during operation wherein glass sheets are moving both continuously in a step-by-step advance as well as uninterruptedly the temperature level within cells II and III will be at or near the level maintained by the program.

In the simplified illustration of FIG. 2 there is a single integral regulator for each cell I, II and III of the furnace. As previously described, however, each cell may include a plurality of zones, and it may be preferable to locate a single thermocouple within each zone. Therefore, as illustrated in FIG. 3 and as may be appreciated by the representation of cycle connector 72, each thermocouple is connected to a separate integral regulator for control ultimately of the level of heat delivered to that zone.

Pyrometer 24 generates an output signal in response to movement of the glass sheet across the unheated zone 22 from cell I to cell II. The output signal provides an input to counter 54 along line 55, and to proportional regulator (regulator) 58 along line 57. Counter 54 provides a count of glass sheets and, in addition, provides an output connected to another input terminal of memory 42. The counter output will develop in coincidence with the advance of the verification signal in the memory, as first received from optical barrier 20, and the coincidence of signals at a second stage of the memory will provide an output along line 44. The output signal along line 44 comprises a second input to integral regulator 47, the output of the memory along line 43 comprising the first. The other required input to integral regulator 47 for purpose of initiating operation of the resistive elements 17 within cell II is provided by regulator 58. Integral regulator 47 likewise controls the resistive elements within cell II either to raise the level of heat from the fixed level or maintain the level of heat at the level for carrying out the normal heating program. In this operation the interposition of memory 42 makes it possible to detect the absence of a glass sheet and to cause advance and transmission of signals in accordance with the furnace rate.

In a manner as previously discussed, thermocouples 33, 34 and 35 are responsive to the level of the radiation energy output of the resistive elements 17 within cell II, and generate a signal output indicative of the level along line 51. This output is connected to an input of integral regulator 47. Should there be a variance in the level of the radiation energy output from that of the programmed level, then integral regulator 47 functions either to increase or decrease the delivery of electrical power to the resistive elements. Consequently, the temperature within the region of cell II will be increased or decreased. If there is no variance, then the level of electrical power will be maintained at the programmed level.

Continued movement of glass sheet 8 across the unheated zone 25 and into cell III results in a control operation of integral regulator 48 similar to the control operation of integral regulator 47. In this operation, the several inputs to the integral regulator 48 derive from memory 42 along lines 43 and 45, from the regulator 58 providing proportional intervention in cell III and proportional regulator (regulator) 60 in response to the sensing of the glass sheet by pyrometer 27. The input along line 43 represents a coincidence of the advance signal and verification signal, as previously discussed, and the input along line 45 represents an advance of the coincident signals through the memory into the third stage as well as an output from counter 54. Thus, the input along line 45 is developed in the same manner as the input along line 44, as previously discussed, also.

The operation of thermocouples 36, 37 and 38 in cell III is similar to the operation of thermocouples 33, 34 and 35 in cell II, for example.

Finally, the glass sheet leaves the furnace through the exit formed by walls 3. Pyrometer 21, located within the region of the exit, provides overall regulating control. To this end, the pyrometer responds to the glass sheet and generates a signal indicative of the actual measured temperature. The signal provides an input to proportional regulator (regulator) 62 whose output is connected to each of the integral regulators 46, 47 and 48. It is the function of the regulator 62 to control the integral regulators proportionally as required by any variance in the measured temperature of the glass sheet from the programmed temperature.

The operation of the furnace is continuous as glass sheets are continuously presented for entry into the enclosure. During normal operation, glass sheets will occupy each of the cells I, II and III. However, according to the previous discussion the continuous aspect of operation is not effected by an absence of a glass sheet on any carriage 11.

As illustrated in FIG. 3, the microprocessor comprises the memory 42, integral regulators 46, 47 and 48, counter 54, and regulators 58, 60 and 62. Operation of the microprocessor may be automatic as depicted by an input from optical barrier 20; although it is also contemplated that the microprocessor may be operated manually by a signal along line 64.

The microprocessors suitable for implementation in the control operation of the furnace are capable of processing digital values, whereas, as previously discussed the measurement responses of the thermocouples and so forth are analog in nature. Therefore, it is required to convert the measurement responses to a digital response. This is carried out by any well-known analog-digital converter 66 and 68. To this end, analog-digital converter 66 is located in the line connecting each pyrometer 21, 24 and 27 to counter 54, and analog-digital converter 68 is located in the line connecting each thermocouple 30, 31, . . . 38 to the respective integral regulators 46, 47 and 48. Since all of the measurement responses cannot be used simultaneously, a cycle connector 70 is located in the line connecting the pyrometers to the counter and a cycle connector 72 is located in the line connecting each thermocouple to its respective integral regulator. These cycle connectors, as the name implies, cycle to pass measurement responses according to the established sequence of operation.

As indicated in FIG. 3, irrespective of the mode of operation of the microprocessor, a digital output indicative of a measurement response of the respective pyrometers (21, 24, 27) is connected to counter (54) and a digital response output indicative of a measurement response of each thermocouple (30, 31, . . . 38) is connected to the respective integral regulators (46, 47 and 48). The memory (42) controls the operation of the furnace through several regulators (58, 60 and 62) whose output is also connected to a respective integral regulator (46, 47 and 48). The integral regulators, in turn, control operation of thyristor (40) whose function it is to rapidly control the supply of power to each of the cells I, II and III and the zones of each cell. Since the signal controlling the supply of power need be an analog signal, the output of each integral regulator (46, 47 and 48) is converted from a digital to an analog signal. An analog-digital converter 74 provides this function. The thyristor, further, is controlled by a cycle connector 76 whose sequence operation follows the sequence operation of cycle connector 72.

We claim:

1. A process for regulating the temperature of a glass sheet in a furnace having several successive cells capable of fast thermal response comprising moving the sheet, in vertical orientation, at a determined rate from cell to cell and heating the sheet at a bending and/or tempering temperature, substantially simultaneously regulating the heating power in each cell at a fixed level, according to a preestablished program and as a function of the wall temperature of each cell, checking the presence of the glass sheet in synchronization with the step-by-step advance upstream at least in one cell of the furnace, and providing a signal which serves as a correction signal to correct the regulation of the power supplied to the following cells.

2. The process according to claim 1, wherein the presence of the glass sheet is checked before entry in the first cell of the furnace.

3. The process according to claim 1, wherein the presence of the glass sheet is checked in a zone separating two cells of the furnace.

4. The process according to claim 2 or 3, wherein a radiation pyrometer is used for checking the presence of the glass sheet and the temperature of the glass sheet measured by the radiation pyrometer is used to regulate the heating power of the following cells.

5. The process according to claim 3, including use of a radiation pyrometer having a relatively narrow measuring area, and wherein the radiation pyrometer is located in one wall of the furnace opposite an opening in the other wall of the furnace.

6. The process according to claim 3, wherein the presence of the glass sheet including measurement of its temperature is checked at least in the intermediate part between the first and second cells.

7. The process according to claim 4, wherein each cell includes a plurality of superposed zones, a radiation pyrometer placed one above another in the respective zones for measuring the temperature of the glass sheet, and wherein the heating power in zones of following cells corresponding to the position of respective pyrometers is regulated separately as a function of the temperature measured.

8. The process according to claim 1, wherein regulation of the power to the cells located downstream from a measuring instrument is assured by a memory register causing a regulating delay corresponding to the time the glass sheet takes to reach each cell.

9. The process according to claim 1, wherein the signal given by the measuring instrument is compared with theoretical signals of the furnace rate, the heating program of all the cells being modified in case of staggering of the real rate, for example, in case of failure of a conveying device.

10. The process according to claim 1, wherein at the furnace exit the temperature of the glass sheet is again measured with a radiation pyrometer, this measurement serving as a parameter for overall regulation of the furnace heating power.

11. The process according to claim 10, wherein the glass sheet being tempered after bending at the furnace exit, its temperature is measured before entry to the tempering station after bending.

12. The process according to claim 1, wherein the signals supplied by the various measuring instruments are introduced in a microprocessor programmed for heating the furnace.

13. The process according to claim 12, wherein the temperature regulating program takes into account an accumulated passage of glass sheets, the recorded power at the moment of start-up of the furnace being higher than during normal operations to compensate for heat losses from contact with cold pieces.

14. The process according to claim 1, wherein a furnace is equipped with fast-response electric heating elements and insulating materials having a high insulating power and low thermal inertia.

15. The process according to claim 14, wherein heating elements are incorporated totally or partially in the surface of an insulating plate consisting essentially of ceramic fibers having a specific weight of about 200 kg/m$^3$.

16. Apparatus for regulating the temperature of a glass sheet in a furnace having an entrance opening, an exit opening and several successive cells capable of fast thermal response located along the wall of the furnace between the openings, a frame located above the furnace, support means for supporting the glass sheet in a vertical orientation, the support means being mounted on the carriage which, in turn, is movable stepwise along the frame at a determined rate for likewise moving the glass sheet along a path of movement within the furnace from cell to cell, heating means within the furnace for heating the glass sheet at a bending and/or tempering temperature, regulating means controlling the heating power of each cell at a fixed level according to a preestablished program and as a function of the temperature of a wall of a cell, and responsive means providing a signal in synchronization with the stepwise advance indicative of the presence of a glass sheet upstream at least in one cell of the furnace, and wherein the signal also serves as a correction signal in the regulation of the heating power supplied to a downstream cell.

17. The apparatus of claim 16 including a heating regulator comprising the regulating means and wherein the responsive means includes an optical pyrometer, and wherein the optical pyrometer is disposed in an interval between two cells.

18. The apparatus of claim 17 wherein each cell includes a plurality of zones, a thermocouple disposed on each zone opposite a heating element, and wherein the heating regulator is a slave to temperaturing measuring signals developed by each thermocouple.

* * * * *